3,207,747
ACYLATED NAPHTHYL MONOAZOPHENYL DYESTUFFS
Werner Bossard and Hans E. Wegmuller, Riehen, near Basel, Switzerland, assignors to J. R. Geigy A.G., Basel, Switzerland
No Drawing. Filed Nov. 14, 1962, Ser. No. 237,759
Claims priority, application Switzerland, Nov. 17, 1961, 13,360/61
4 Claims. (Cl. 260—204)

The invention concerns new, water dispersible azo dyestuffs, processes for the production thereof, processes for the dyeing of hydrophobic synthetic textile material using the new dyestuffs and, as industrial product, the material dyed with the aid of these dyestuffs.

It has been found that azo dyestuffs which are difficultly soluble in water are obtained if compounds of the Formula I

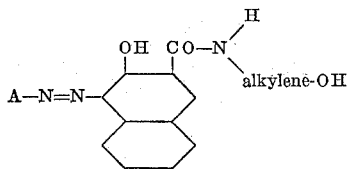

I in which

A represents a phenyl radical which contains at least one electrophilic substituent which does not dissociate acid in water, in o- or p-position to the azo group, and "Alkylene" represents a lower alkylene radical with maximally 4 and preferably with 2 to 4 carbon atoms, are reacted with acylating agents to form esters of the general Formula II

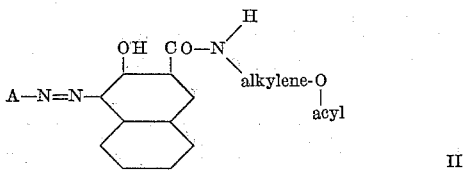

II wherein A and "alkylene" have the meanings given in Formula I and "acyl" represents the acid radical of the acylating agent.

The term "electrophilic substituents which does not dissociate acid in water" as used in this specification and the appended claims, of which substituents there are preferably not more than three present in A, means the nitro, cyano and trifluoromethyl group, the carbalkoxy groups, having not more than 8 carbon atoms, such as carboxylic acid methyl, ethyl or butyl ester groups, the unsubstituted, mono- and disubstituted carbamoyl amide groups with maximally 8 carbon atoms, the unsubstituted, mono- and disubstituted sulphonic acid amide groups, wherein "amide" is a radical with not more than 8 carbon atoms, 1 nitrogen atom and 0 to 1 oxygen atom, such as sulphonic acid dimethylamide, diethyl amide, dibutylamide, phenylmethylamide, piperidide and morpholide groups, phenoxy sulphonyl and chlorophenoxy sulphonyl radicals with maximally 8 carbon atoms; the keto groups with 2 to 8 carbon atoms such as acetyl, propionyl, butyroyl, benzoyl groups; the halogens fluorine, chlorine, bromine.

Further optional substituents compatible with the aforesaid electrophilic substituent or substituents in the benzene nucleus of A and designated in this specification as "compatible substituents" are alkyl with maximally 8 carbon atoms, such as methyl, ethyl, propyl, isopropyl, tert. amyl, isooctyl, cyclohexyl, benzyl, phenyl, methylphenyl, chlorophenyl; alkoxy with maximally 4 carbon atoms such as methoxy and ethoxy, which may be optionally hydroxylated as, for instance, in 2-hydroxyethoxy; phenoxy; chlorophenoxy; methylphenoxy; acetylamino, chloroacetylamino, β-chloropropionylamino, benzoylamino, chlorobenzoylamino, chloromethylsulphonylamino, chlorotriazinylamino and chloropyrimidylamino groups.

Since the dyestufs are difficultly soluble, as has already been stated, water solubilising groups which dissociate acid in water such as —$SO_3H$ or the —COOH group are excluded.

Preferably A is a phenyl radical which contains one to two of the aforesaid electrophilic substituents, which do not dissociate acid in water, in the o- and p-position to the azo group.

The compounds according to the invention are produced by coupling diazonium compounds of the benzene series which contain, in o- or p-position to the azo group, at least one electrophilic substituent which does not dissociate acid in water, with suitable hydroxyalkylamides of β-hydroxy-naphthoic acid.

The diazo components necessary for the production of preferred compounds of Formula I, usable according to the invention, in which A is an electrophilically substituted phenyl radical are, for example, 1-amino-2,4-dinitrobenzene and 1-amino-2-cyano-4-nitrobenzene.

The coupling components necessary for the production of compounds of Formula I, usable accordingto the invention are obtained, e.g., from esters of β-hydroxy-naphthoic acid by reaction with lower primary hydroxyalkylamines.

The acylation of compounds of Formula I of the invention can be performed with carboxylic acid chlorides such as acetyl chloride, chloroacetyl chloride, propionyl chloride, butyryl chloride, benzoyl chloride, chlorobenzoyl chloride, 4-methylsulphonyl-1-benzoyl chloride, 4-nitrobenzoyl chloride, with sulphonic acid chlorides such as methyl sulphonic acid chloride, ethyl sulphonic acid chlorides, benzene sulphonic acid chloride, diethylamino sulphochloride or p-toluene sulphonic acid chloride, or with anhydrides such as acetanhydride, and also with ester chlorides of carbonic acid such as chlorocarbonic acid methyl ester, ethyl ester, propyl ester, butyl or ethoxyethyl ester.

The acylation is performed advantageously at a raised temperature, if necessary in the presence of an acid binding agent such as sodium acetate or pyridine. In certain cases it is of advantage to perform the reaction in suitable organic solvents such as chlorobenzene or dioxan.

It is surprising that the acylated dyestuffs according to the invention have considerably better affinity to polyester fibres than the starting materials. In addition they have increased drawing power, and the dyeings attained therewith have very good fastness to rubbing. Compared with the known azo compounds of the phenyl-azo-2-hydroxy-naphthalene-3-carboxylic acid-alkyl, -hydroxyalkyl, -aralkyl, -cycloalkyl, or -arylamide series, the acylated dyestuffs according to the invention have a considerably improved drawing power onto polyglycol terephthalate fibres. The dyeings on polyester fibres with compounds according to the invention having two electronegative substituents in the diazo component, one of which is a nitro group in p-position to the azo bridge and the other is a nitro or cyano group in o-position to the azo bridge, also differ from dyeings obtained with the known dyestuffs in their considerably increased fastness to light. Polyester fibres dyed with the last-mentioned dyestuffs according to the invention are distinguished by their excellent drawing power and very good fastness to rubbing, light and sublimation.

The dyestuffs according to the invention are brought into easily distributable form by milling with dispersing agents. Suitable dispersing agents are, e.g. anionic such as alkylaryl sulphonates, condensation products of aldehydes, i.e. formaldehyde and naphthalene sulphonic acids, lignin sulphonates, or non-anionic such as fatty alcohol polyglycol ethers. Mixtures of these dispersing agents are used with advantage.

The dyestuffs according to the invention are suitable for the dyeing of hydrophobic synthetic textile fibres from aqueous dispersion, e.g. for the dyeing of cellulose di- and tri-acetate, particularly however, for the dyeing of high molecular esters of aromatic polycarboxylic acids and polyfunctional alcohols, for example, glycol terephthalates such as "Terylene" of Imperial Chemical Industries, London, "Dacron" of E. I. du Pont de Nemours & Co., Wilmington, Delaware, U.S.A., "Tergal" of Rhodiaceta, Lyons, France, or "Trevira" of Farbwerke Hoechst, Frankfurt am Main, Germany. The dyestuffs can also be used, however, for the dyeing of synthetic polyamide fibres such as "nylon" of Du Pont de Nemours or of "Perlon" of Farbenfabriken Bayer, Leverkusen, Germany.

The dyeing of polyester fibres with aqueous dispersions of dyestuffs according to the invention is performed advantageously at temperatures of over 100° C. under pressure. However, the dyeing can also be performed at the boiling point of the water in the presence of carriers such as, e.g., phenylphenol, polychlorobenzene compounds or similar auxiliaries.

In individual cases, the drawing power of the dyestuffs can be even improved by mixing two or more of the dyestuffs according to the invention.

Depending on the composition of the dyestuffs, yellow, orange and red dyeings can be attained on polyester fibres which have very good fastness to rubbing, sublimation and light.

Preferred dyestuffs of the invention correspond to the formula

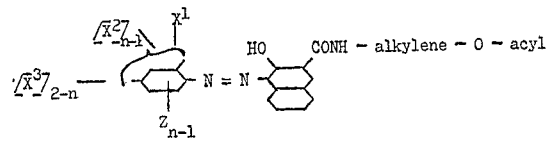

wherein $n$ is an integer ranging from 1 to 2, $X^1$ is nitro, $X^2$ is nitro, cyano, chloro or bromo, $X^3$ is hydrogen, trifluoromethyl, alkoxycarbonyl having a total of maximally 8, and preferably not more than 5 carbon atoms, N-alkyl-substituted carbamoyl with maximally 8 carbon atoms, especially N,N-diethyl, carbamoyl, phenoxysulfonyl, methylphenoxysulfonyl, chlorophenoxysulfonyl, or N-alkyl-substituted, N-phenyl-substituted and N-phenyl-N-alkyl-substituted sulfamyl, all of said sulfamyl radicals having not more than 8 carbon atoms, especially N,N-diethylsulfamyl and N-phenyl-N-methylsulfamyl, Z is hydrogen, chloro, bromo or fluoro, "Alkylene" is ethylene, propylene or butylene (i.e. an alkylene radical with 2 to 4 carbon atoms), especially 1,3-propylene, and "Acyl" is the acyl radical of an acylating agent, having from 0 to 1 sulphur atom and from 1 to 10 carbon atoms, which is substituted with from 0 to 1 chlorine atom. This means that, as used in this specification and the appended claims, "Acyl" is alkyl carbonyl having a total of maximally 8 carbon atoms, especially acetyl, propionyl or butyryl, alkoxy carbonyl having a total of maximally 8 carbon atoms, preferably carbo ethoxy, chloroalkyl carbonyl having a total of maximally 8 carbon atoms, preferably chloroacetyl, further benzoyl, chlorobenzoyl, methylbenzoyl, phenyl-sulphonyl, chlorophenyl-sulphonyl or methylphenyl-sulphonyl.

Particularly interesting among these preferred compounds are those of the formula

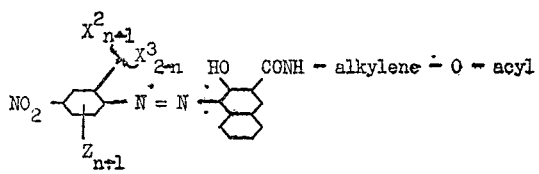

wherein $n$, $X^2$, $X^3$, Z, "alkylene" and "acyl" have the meaning given under Formula III.

Dyestuffs of the invention which are particularly valuable because of their excellent drawing power and fastness to light and sublimation are those of the formulas

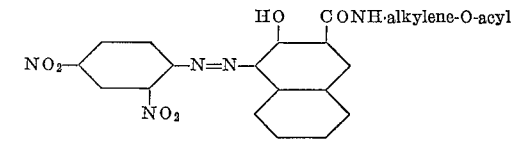

and

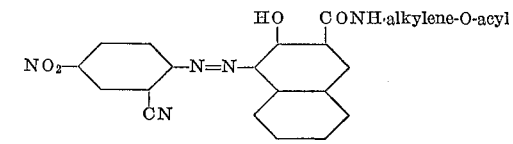

wherein "alkylene" and "acyl" have the meanings given under Formula III.

The following examples illustrate the invention. Where not otherwise stated, parts are given as parts by weight. The temperatures are in degrees centigrade. The relationship of parts by weight to parts by volume is as that of grammes to cubic centimetres.

EXAMPLE 1

12 parts of 1-(2'-nitro-phenylazo)-2-hydroxynaphthalene-3-carboxylic acid - N - β - hydroxyethylamide and 60 parts of acetanhydride are boiled for 4 hours. After cooling, the whole is diluted with 200 parts of ethyl alcohol and 50 parts of water. The new dyestuff has the composition

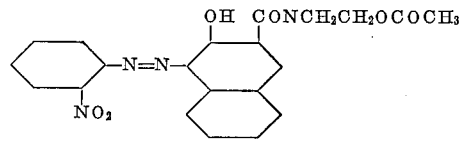

and crystallises in the form of orange needles. The precipitate is filtered off, washed with ethyl alcohol and then with water and dried in vacuo at 60–70°. Milled with a synthetic dispersing agent, the dyestuff so obtained dyes polyester fibres or cellulose triacetate fibres in pure scarlet shades from aqueous dispersion, possibly in the presence of carriers. The dyebath is substantially exhausted. The dyeings are fast to rubbing, sublimation and light.

Dyestuffs having equivalent properties are obtained if in the above example with otherwise the same procedure, 12 parts of the compounds given in column 1 of the following Table I are used as starting materials and acetylated.

Table I

| No. | Starting material | Colour of chloroform solution of acylated dyestuff |
|---|---|---|
| 1 | CH₃–⌬(NO₂)–N=N–⌬⌬(OH, CONHCH₂CH₂OH) | Orange. |
| 2 | O₂N–⌬(OCH₃)–N=N–⌬⌬(OH, CONHCH₂CH₂OH) | Red. |
| 3 | CH₃O–⌬(NO₂)–N=N–⌬⌬(OH, CONHCH₂CH₂OH) | Do. |
| 4 | O₂N–⌬(Cl, NO₂)–N=N–⌬⌬(OH, CONHCH₂CH₂OH) | Orange. |
| 5 | CN–⌬(CN)–N=N–⌬⌬(OH, CONHCH₂CH₂OH) | Do. |
| 6 | (C₂H₅)₂N–SO₂–⌬(NO₂)–N=N–⌬⌬(OH, CONHCH₂CH₂CH₂OH) | Do. |
| 7 | O₂N–⌬(Cl, Cl)–N=N–⌬⌬(OH, CONHCH₂CH₂CH₂OH) | Do. |
| 8 | CF₃–⌬(NO₂)–N=N–⌬⌬(OH, CONHCH₂CH₂CH₂OH) | Do. |
| 9 | CH₃–⌬(NO₂)–N=N–⌬⌬(OH, CONHCH₂CH₂CH₂OH) | Do. |

EXAMPLE 2

15 parts of 1-(2′-nitro-phenylazo)-2-hydroxynaphthalene-3-carboxylic acid-β-hydroxyethylamide in 250 parts of dioxan are heated for 8 hours at 100–110° with 50 parts of benzoyl chloride and 25 parts of anhydrous sodium acetate. The reaction mixture is then concentrated in vacuo to about 100 parts and, after cooling, 300 parts of ethyl alcohol are added. The precipitate which forms of the composition

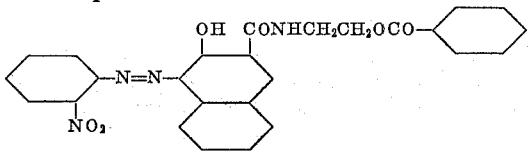

is filtered off under suction, washed with ethyl alcohol and then with water and dried. It is a red powder. A composition produced by milling the dyestuff with an anion active dispersing agent dyes polyester fibres such as "Terylene" of Imperial Chemical Industries, London, in scarlet shades from an aqueous dispersion, possibly with the addition of a carrier such as o-phenylphenol. The dyebath is substantially exhausted. The dyeings are fast to washing, rubbing and sublimation.

If in the above example, the 15 parts of starting material are replaced by equivalent amounts of the coupling products given in the first column of the following Table II and these are acylated under the conditions described in the above example with the corresponding number of parts by weight of the carboxylic acid chlorides given in column 2, then dyestuffs are obtained which produce polyester dyeings having similarly good properties.

Table II

| No. | Starting material | Carboxylic acid chloride | Shade of acylated dyestuff on polyester fibres |
|-----|------------------|--------------------------|------------------------------------------------|
| 1 | $CH_3-C_6H_3(NO_2)-N=N-$ coupler (OH, CONHCH$_2$CH$_2$OH substituted naphthol) | $C_6H_5COCl$ | Scarlet. |
| 2 | $O_2N-C_6H_3(Cl)-N=N-$ coupler (OH, CONHCH$_2$CH$_2$OH) | $C_6H_5COCl$ | Orange. |
| 3 | $O_2N-C_6H_3(Cl)-N=N-$ coupler (OH, CONHCH$_2$CH$_2$OH) | $CH_3CH_2COCl$ | Do. |
| 4 | $O_2N-C_6H_2(Cl)(O_2N)-N=N-$ coupler (OH, CONHCH$_2$CH$_2$OH) | $CH_3CH_2COCl$ | Do. |
| 5 | $O_2N-C_6H_2(Cl)(Cl)-N=N-$ coupler (OH, CONHCH$_2$CH$_2$OH) | $ClCH_2COCl$ | Do. |
| 6 | $(C_6H_5)(CH_3)N-SO_2-C_6H_3(NO_2)-N=N-$ coupler (OH, CONHCH$_2$CH$_2$OH) | $ClCH_2COCl$ | Do. |
| 7 | $(C_6H_5)(CH_3)N-SO_2-C_6H_3(NO_2)-N=N-$ coupler (OH, CONHCH$_2$CH$_2$OH) | $CH_3CH_2CH_2COCl$ | Do. |
| 8 | $O_2N-C_6H_3(COOC_4H_9)-N=N-$ coupler (OH, CONHCH$_2$CH$_2$OH) | $CH_3CH_2CH_2COCl$ | Scarlet. |
| 9 | $CH_3-C_6H_3(NO_2)-N=N-$ coupler (OH, CONHCH$_2$CH$_2$CH$_2$OH) | $CH_3CH_2COCl$ | Do. |
| 10 | $O_2N-C_6H_3(Br)-N=N-$ coupler (OH, CONHCH$_2$CH$_2$OH) | $CH_3CH_2COCl$ | Orange. |

EXAMPLE 3

15 parts of 1-(2'-cyano-4'-nitro-phenylazo)-2-hydroxynaphthalene-3-carboxylic acid-N-γ-hydroxypropylamide are boiled for 3 hours with 60 parts of glacial acetic acid and 20 parts of acetanhydride. After cooling, 200 parts of ethyl alcohol and 100 parts of water are added to the reaction mixture. The scarlet precipitate formed of the formula

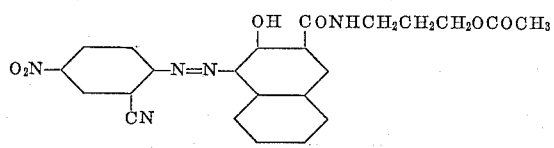

is filtered off, washed first with ethyl alcohol and then with water and dried. A preparation obtained by milling the dyestuff obtained with a condensation product of naphthalene-2-sulphonic acid and formaldehyde dyes polyglycol terephthalate fibres such as "Dacron" (Du Pont de Nemours, Delaware, U.S.A.) from an aqueous dispersion, possibly in the presence of a carrier such as the sodium salt of o-phenylphenol, in pure orange shades. The dye bath is substantially exhausted. The dyeings have very good fastness to washing, light and sublimation.

EXAMPLE 4

12 parts of 1-(2',4'-dinitro-phenylazo)-2-hydroxynaphthalene-3-carboxylic acid-β-hydroxyethylamide are heated for 8 hours at 100–110° with 200 parts of dioxan and 30 parts of benzoyl chloride and 20 parts of anhydrous sodium acetate. The reaction mixture is then concentrated in vacuo to about 75 parts and, after cooling, 200 parts of methyl alcohol are added. The precipitate formed is filtered off, washed with methyl alcohol and then with water and dried. The dyestuff is a scarlet powder which corresponds to the formula A preparation obtained by milling with a condensation product of naphthalene-2-sulphonic acid and formaldehyde dyes polyglycol terephthalate fibres such as "Terylene" (I.C.I. London, England) from aqueous dispersion, possibly in the presence of carriers, in orange shades. The dyebath is substantially exhausted. The dyeings have very good fastness to washing, rubbing, light and sublimation.

Dyestuffs having similar properties are obtained if, in the above example, instead of 12 parts of starting material, equivalent amounts of the starting materials given column 1 of the following Table III are reacted under the usual conditions with the corresponding acylating agents given in column 2.

*Table III*

| No. | Starting material | Acylating agent | Shade of acylated dyestuff on polyester fibres |
| --- | --- | --- | --- |
| 1 | $O_2N$-⟨⟩(CN)-N=N-⟨⟩(OH)(CONHCH$_2$CH$_2$OH) | $CH_3CH_2COCl$ | Orange. |
| 2 | $O_2N$-⟨⟩(CN)-N=N-⟨⟩(OH)(CONHCH$_2$CH$_2$OH) | $CH_3$-⟨⟩-$SO_2Cl$ | Do. |
| 3 | $O_2N$-⟨⟩(NO$_2$)-N=N-⟨⟩(OH)(CONHCH$_2$CH$_2$OH) | $CH_3$-⟨⟩-$SO_2Cl$ | Do. |
| 4 | $O_2N$-⟨⟩(NO$_2$)-N=N-⟨⟩(OH)(CONHCH$_2$CH$_2$OH) | $ClCOOC_2H_5$ | Do. |
| 5 | $O_2N$-⟨⟩(CN)-N=N-⟨⟩(OH)(CONHCH$_2$CH$_2$CH$_2$OH) | $ClCOOC_2H_5$ | Do. |
| 6 | $O_2N$-⟨⟩(CN)-N=N-⟨⟩(OH)(CONHCH$_2$CH$_2$CH$_2$OH) | $C_6H_5COCl$ | Do. |

Table III—Continued

| No. | Starting material | Acylating agent | Shade of acylated dyestuff on polyester fibres |
|---|---|---|---|
| 7 | O₂N—⬡(NO₂)—N=N—⬡⬡(OH)(CONHCH₂CH₂CH₂OH) | C₆H₅COCl | Orange. |
| 8 | O₂N—⬡(NO₂)—N=N—⬡⬡(OH)(CONHCH₂CH₂CH₂OH) | CH₃C₆H₄SO₂Cl | Do. |
| 9 | O₂N—⬡(NO₂)—N=N—⬡⬡(OH)(CONHCH₂CH₂CH₂OH) | CH₃CH₂CH₂COCl | Do. |
| 10 | O₂N—⬡(NO₂)—N=N—⬡⬡(OH)(CONHCH₂CH₂CH₂OH) | CH₃SO₂Cl | Do. |

EXAMPLE 5

4 parts of 1-(2'-nitro-4'-methyl-phenylazo)-2-hydroxy-naphthalene-3-carboxylic acid-β-hydroxyethylamide in 200 parts of dioxan are heated for 8 hours at 110–120° with 25 parts of p-toluene sulphonic acid chloride and 5 parts of anhydrous sodium acetate. After cooling, 100 parts of ethyl alcohol and 500 parts of water are added to the reaction mixture. The precipitate which forms is filtered off under suction, washed with methyl alcohol and then with water and dried in vacuo at 60–70°. The dyestuff is a red powder and corresponds to the formula

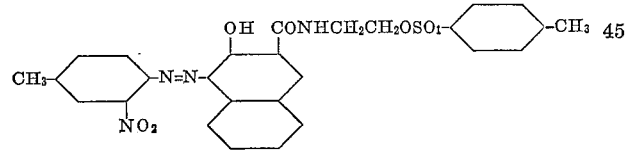

A dye preparation milled with a synthetic dispersing agent which contains the dyestuff obtained in fine distribution dyes polyester fibres in pure scarlet shades from an aqueous dispersion, possibly in the presence of carriers. The dyebath is substantially exhausted. The dyeings are fast to rubbing, washing and sublimation.

Dyestuffs having similar properties are obtained if, in the above example, instead of 4 parts of starting material, equivalent amounts of the starting materials given in column 1 of the following Table IV are reacted under the usual conditions with the corresponding acylating agents given in column 2.

Table IV

| No. | Starting material | Acylating agent | Shade of acylated dyestuff on polyester fibres |
|---|---|---|---|
| 1 | O₂N—⬡(Cl)—N=N—⬡⬡(OH)(CONHCH₂CH₂CH₂CH₂OH) | CH₃—⬡—SO₂Cl | Orange. |
| 2 | CN—⬡(CN)—N=N—⬡⬡(OH)(CONHCH₂CH₂CH₂CH₂OH) | CH₃—⬡—SO₂Cl | Do. |
| 3 | O₂N—⬡(NO₂)(Cl)—N=N—⬡⬡(OH)(CONHCH₂CH₂CH₂OH) | CH₃—⬡—SO₂Cl | Do. |

Table IV—Continued

| No. | Starting material | Acylating agent | Shade of acylated dyestuff on polyester fibres |
|---|---|---|---|
| 4 | (C₂H₅)₂N—CO—C₆H₃(NO₂)—N=N—[naphthalene with OH, CONHCH₂CH₂OH] | CH₃—C₆H₄—SO₂Cl | Orange. |
| 5 | C₆H₅—OSO₂—C₆H₃(NO₂)—N=N—[naphthalene with OH, CONHCH₂CH₂OH] | (CH₃CO)₂O | Do. |
| 6 | O₂N—C₆H₃(SO₂O—C₆H₄—CH₃)—N=N—[naphthalene with OH, CONHCH₂CH₂CH₂OH] | (CH₃CO)₂O | Do. |
| 7 | (Cl)C₆H₄—OSO₂—C₆H₃(NO₂)—N=N—[naphthalene with OH, CONHCH₂CH₂OH] | (CH₃CO)₂O | Do. |
| 8 | O₂N—C₆H₃(F)—N=N—[naphthalene with OH, CONHCH₂CH₂OH] | C₆H₅COCl | Do. |

EXAMPLE 6

3 parts of the dyestuff obtained according to Example 3 are dispersed in 4000 parts of water. 20 parts of the sodium salt of o-phenylphenol, 20 parts of diammonium phosphate are added to this dispersion and 100 parts of terephthalic acid ester yarn are dyed for 1½ hours at 95–98°. The dyebath is substantially exhausted. The dyeing is rinsed and after-treated with dilute sodium hydroxide solution and a dispersing agent. In this way, a pure orange dyeing is obtained which is fast to rubbing, sublimation and light.

If in the above example, the 100 parts of polyester yarn are replaced by 100 parts of cellulose triacetate fabric, dyeing is performed under the conditions given and the dyeing is then rinsed with water, an orange dyeing having very good properties is obtained.

EXAMPLE 7

In a pressure dyeing apparatus, 2 parts of the dyestuff obtained according to Example 4 are finely suspended in 2000 parts of water which contains 4 parts of a synthetic dispersing agent. The pH of the dyebath is adjusted to 6–6.5 with acetic acid. 100 parts of terephthalic acid polyester fabric are introduced at 50°, the bath is heated within 30 minutes to 126–135° and dyeing is performed for 50 minutes at this temperature. The dyebath is well exhausted. The dyeing is then rinsed with water, soaped and dried. Under these conditions, an orange dyeing is obtained which is fast to washing, rubbing, light and sublimation.

The dyestuffs described in the other examples produce dyeings of equivalent quality by this process.

EXAMPLE 8

Polyglycol terephthalate fabric (such as "Dacron" of E. I. du Pont de Nemours, Wilmington, Delaware (U.S.A.) is impregnated in a foulard at 40° with a liquor of the following composition:

20 parts of a dyestuff obtained according to Example 4, finely dispersed in 7.5 parts of sodium alginate,
20 parts of triethanolamine,
20 parts of octylphenol polyglycol ether, and
900 parts of water.

The fabric is wrung out to a content of 100% and dried at 100° after which the dye is fixed for 30 seconds at a temperature of 210°. The dyed goods are rinsed with water, soaped and dried. Under these conditions an orange dyeing is obtained which is fast to washing, rubbing, light and sublimation.

The dyestuffs described in the other examples produce dyeings of equal quality by this process.

What is claimed is:
1. A compound of the formula

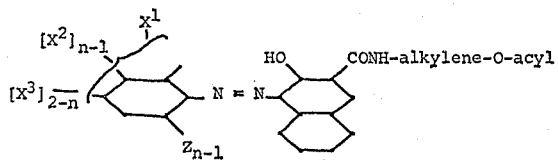

wherein $n$ is an integer ranging from 1 to 2,
$X^1$ is nitro,
$X^2$ is a member selected from the group consisting of nitro, cyano, chloro and bromo,
$X^3$ is a member selected from the group consisting of hydrogen, trifluoromethyl, lower alkoxy-carbonyl, N-lower alkyl-substituted carbamoyl, phenoxysulfonyl, methylphenoxysulfonyl, chlorophenoxysulfonyl, N-lower alkyl-substituted sulfamyl, N-phenyl-substituted sulfamyl and N-phenyl-N-lower alkyl-substituted sulfamyl, Z is a member selected from the group consisting of hydrogen, chloro, bromo and fluoro,
"alkylene" is an alkylene radical with from 2 to 4 carbon atoms, and
"acyl" is an acyl radical selected from the group consisting of lower alkyl carbonyl, lower alkoxy carbonyl, chloro(lower)alkyl-carbonyl, phenyl-carbonyl, chlorophenyl-carbonyl, methylphenyl-carbonyl, phenyl-sulphonyl, chlorophenyl-sulphonyl and methylphenyl-sulphonyl.

2. A compound of the formula

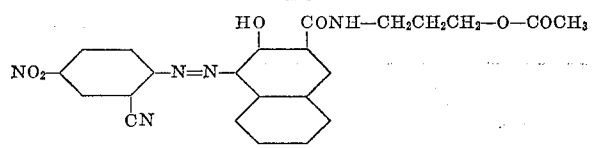

3. A compound of the formula

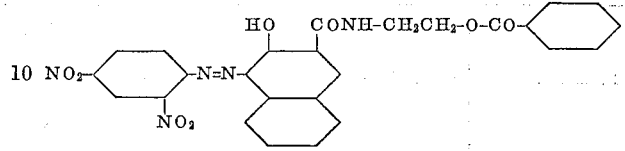

4. A compound of the formula

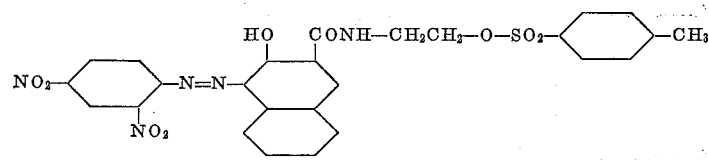

References Cited by the Examiner

UNITED STATES PATENTS

| | | | |
|---|---|---|---|
| 2,219,280 | 10/40 | Graenacher | 260—156 |
| 2,323,314 | 7/43 | Dickey et al. | 260—199 |
| 3,001,982 | 9/61 | Krzikalla et al. | 260—204 X |
| 3,057,673 | 10/62 | Mills et al. | 8—54 |

FOREIGN PATENTS

| | | |
|---|---|---|
| 648,768 | 8/37 | Germany. |
| 544,817 | 4/42 | Great Britain. |

CHARLES B. PARKER, *Primary Examiner.*